United States Patent
Ballard

(10) Patent No.: US 7,301,718 B2
(45) Date of Patent: Nov. 27, 2007

(54) RECORDING ERRORS IN TAPE DRIVES

(75) Inventor: Curtis C. Ballard, Eaton, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 92 days.

(21) Appl. No.: 11/047,171

(22) Filed: Jan. 31, 2005

(65) Prior Publication Data

US 2006/0171055 A1    Aug. 3, 2006

(51) Int. Cl.
G11B 19/02 (2006.01)

(52) U.S. Cl. ............................................... 360/69

(58) Field of Classification Search ................. 360/69; 340/10.1, 815.4; 711/111; 700/247; 235/462.01
See application file for complete search history.

(56) References Cited

U.S. PATENT DOCUMENTS

| | | | | |
|---|---|---|---|---|
| 5,471,561 | A | * | 11/1995 | Cowgill et al. .............. 700/247 |
| 5,819,309 | A | * | 10/1998 | Gray .......................... 711/111 |
| 5,923,876 | A | | 7/1999 | Teague |
| 6,100,788 | A | * | 8/2000 | Frary ........................ 340/10.1 |
| 6,161,192 | A | | 12/2000 | Lubbers |
| 6,170,063 | B1 | | 1/2001 | Golding |
| 6,295,578 | B1 | | 9/2001 | Dimitroff |
| 6,397,293 | B2 | | 5/2002 | Shrader |
| 6,476,725 | B2 | * | 11/2002 | Aguren et al. .......... 340/815.4 |
| 6,487,636 | B1 | | 11/2002 | Dolphin |
| 6,490,122 | B1 | | 12/2002 | Holmquist |
| 6,493,656 | B1 | | 12/2002 | Houston |
| 6,505,268 | B1 | | 1/2003 | Schultz |
| 6,523,749 | B2 | | 2/2003 | Reasoner |
| 6,546,459 | B2 | | 4/2003 | Rust |
| 6,560,673 | B2 | | 5/2003 | Elliot |
| 6,587,962 | B1 | | 7/2003 | Hepner |
| 6,594,745 | B2 | | 7/2003 | Grover |
| 6,601,187 | B1 | | 7/2003 | Sicola |
| 6,606,690 | B2 | | 8/2003 | Padovano |
| 6,609,145 | B1 | | 8/2003 | Thompson |
| 6,612,491 | B1 | * | 9/2003 | Iwaguchi et al. ............ 235/437 |
| 6,628,205 | B2 | * | 9/2003 | Aguren et al. .......... 340/815.4 |
| 6,629,108 | B2 | | 9/2003 | Frey |
| 6,629,273 | B1 | | 9/2003 | Patterson |
| 6,643,795 | B1 | | 11/2003 | Sicola |
| 6,647,514 | B1 | | 11/2003 | Umberger |
| 6,658,590 | B1 | | 12/2003 | Sicola |
| 6,663,003 | B2 | | 12/2003 | Johnson |
| 6,672,509 | B2 | * | 1/2004 | Shimada et al. ........ 235/462.01 |
| 6,681,308 | B1 | | 1/2004 | Dallmann |
| 6,708,285 | B2 | | 3/2004 | Oldfield |
| 6,715,101 | B2 | | 3/2004 | Oldfield |
| 6,718,404 | B2 | | 4/2004 | Reuter |
| 6,718,434 | B2 | | 4/2004 | Veitch |
| 6,721,902 | B1 | | 4/2004 | Cochran |
| 6,725,393 | B1 | | 4/2004 | Pellegrino |
| 6,742,020 | B1 | | 5/2004 | Dimitroff |
| 6,745,207 | B2 | | 6/2004 | Reuter |

(Continued)

Primary Examiner—Fred F. Tzeng

(57) ABSTRACT

Exemplary tape library architectures and methods for recording errors in a tape drive are described. One exemplar method may be implemented in a processor a tape drive controller. The method comprises receiving, in a tape drive controller, an external identifier associated with a tape cartridge, recording the external identifier in a memory location associated with the tape drive controller, and associating, in a subsequent error analysis routine, an error in the tape drive with the external identifier of the tape cartridge in the tape drive.

14 Claims, 4 Drawing Sheets

U.S. PATENT DOCUMENTS

| | | |
|---|---|---|
| 6,763,409 B1 | 7/2004 | Elliot |
| 6,772,231 B2 | 8/2004 | Reuter |
| 6,775,790 B2 | 8/2004 | Reuter |
| 6,795,904 B1 | 9/2004 | Kamvysselis |
| 6,802,023 B2 | 10/2004 | Oldfield |
| 6,807,605 B2 | 10/2004 | Umberger |
| 6,817,522 B2 | 11/2004 | Brignone |
| 6,823,453 B1 | 11/2004 | Hagerman |
| 6,839,824 B2 | 1/2005 | Camble |
| 6,842,833 B1 | 1/2005 | Phillips |
| 6,845,403 B2 | 1/2005 | Chadalapaka |
| 2002/0019863 A1 | 2/2002 | Reuter |
| 2002/0019908 A1 | 2/2002 | Reuter |
| 2002/0019920 A1 | 2/2002 | Reuter |
| 2002/0019922 A1 | 2/2002 | Reuter |
| 2002/0019923 A1 | 2/2002 | Reuter |
| 2002/0048284 A1 | 4/2002 | Moulton |
| 2002/0188800 A1 | 12/2002 | Tomaszewski |
| 2003/0051109 A1 | 3/2003 | Cochran |
| 2003/0056038 A1 | 3/2003 | Cochran |
| 2003/0063134 A1 | 4/2003 | Lord |
| 2003/0074492 A1 | 4/2003 | Cochran |
| 2003/0079014 A1 | 4/2003 | Lubbers |
| 2003/0079074 A1 | 4/2003 | Sicola |
| 2003/0079082 A1 | 4/2003 | Sicola |
| 2003/0079083 A1 | 4/2003 | Lubbers |
| 2003/0079102 A1 | 4/2003 | Lubbers |
| 2003/0079156 A1 | 4/2003 | Sicola |
| 2003/0084241 A1 | 5/2003 | Lubbers |
| 2003/0101318 A1 | 5/2003 | Kaga |
| 2003/0110237 A1 | 6/2003 | Kitamura |
| 2003/0126315 A1 | 7/2003 | Tan |
| 2003/0126347 A1 | 7/2003 | Tan |
| 2003/0140191 A1 | 7/2003 | McGowen |
| 2003/0145045 A1 | 7/2003 | Pellegrino |
| 2003/0145130 A1 | 7/2003 | Schultz |
| 2003/0170012 A1 | 9/2003 | Cochran |
| 2003/0177323 A1 | 9/2003 | Popp |
| 2003/0187847 A1 | 10/2003 | Lubbers |
| 2003/0187947 A1 | 10/2003 | Lubbers |
| 2003/0188085 A1 | 10/2003 | Arakawa |
| 2003/0188114 A1 | 10/2003 | Lubbers |
| 2003/0188119 A1 | 10/2003 | Lubbers |
| 2003/0188153 A1 | 10/2003 | Demoff |
| 2003/0188218 A1 | 10/2003 | Lubbers |
| 2003/0188229 A1 | 10/2003 | Lubbers |
| 2003/0188233 A1 | 10/2003 | Lubbers |
| 2003/0191909 A1 | 10/2003 | Asano |
| 2003/0191919 A1 | 10/2003 | Sato |
| 2003/0196023 A1 | 10/2003 | Dickson |
| 2003/0212781 A1 | 11/2003 | Kaneda |
| 2003/0229651 A1 | 12/2003 | Mizuno |
| 2003/0236952 A1 | 12/2003 | Grieff |
| 2003/0236953 A1 | 12/2003 | Grieff |
| 2004/0019740 A1 | 1/2004 | Nakayama |
| 2004/0022546 A1 | 2/2004 | Cochran |
| 2004/0024838 A1 | 2/2004 | Cochran |
| 2004/0024870 A1 | 2/2004 | Hirata |
| 2004/0024961 A1 | 2/2004 | Cochran |
| 2004/0034745 A1 | 2/2004 | Hameed |
| 2004/0049634 A1 | 3/2004 | Cochran |
| 2004/0078638 A1 | 4/2004 | Cochran |
| 2004/0078641 A1 | 4/2004 | Fleischmann |
| 2004/0128404 A1 | 7/2004 | Cochran |
| 2004/0215602 A1 | 10/2004 | Cioccarelli |
| 2004/0230859 A1 | 11/2004 | Cochran |
| 2004/0267959 A1 | 12/2004 | Cochran |
| 2005/0190660 A1* | 9/2005 | Wakelin et al. .......... 369/30.27 |
| 2005/0229020 A1* | 10/2005 | Goodman et al. ............. 714/2 |

* cited by examiner

RECORDING ERRORS IN TAPE DRIVES

TECHNICAL FIELD

The described subject matter relates to electronic computing, and more particularly to error management in tape libraries.

BACKGROUND

Tape libraries may be used as one component of a data storage architecture. A conventional tape library comprises a plurality of tape drives, the operations of which are controlled by one or more tape drive controllers, and a separate controller that controls the operations of the library.

Periodically, errors occur in tape drives. Some tape drives maintain a log of drive errors that occur to facilitate analysis and correction of technical problems with the drive. The event log records information about the nature of the error and operations of the drive, and may also include information about the operating hardware and software.

SUMMARY

In an exemplary embodiment a method of recording an error in a tape drive comprises receiving, in a tape drive controller, an external identifier associated with a tape cartridge, recording that external identifier in a memory location associated with the tape, reading the external identifier from the memory associated with the tape, recording the external identifier in an memory location associated with the tape controller, and associating, in a subsequent error analysis routine, an error in the tape drive with the external identifier of the tape cartridge in the tape drive.

DETAILED DESCRIPTION

Described herein are exemplary tape library architectures, and methods for recording an error in a tape drive. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

In exemplary embodiments, the architectures and methods may be implemented in tape storage libraries such as the tape storage libraries described in U.S. Pat. Nos. 5,926,341; 6,028,733; or U.S. Pat. No. 6,421,306, commonly assigned to the assignee of the present application, the disclosures of which are incorporated by reference herein in their entirety.

Exemplary Tape Library Architecture

Figure 1:
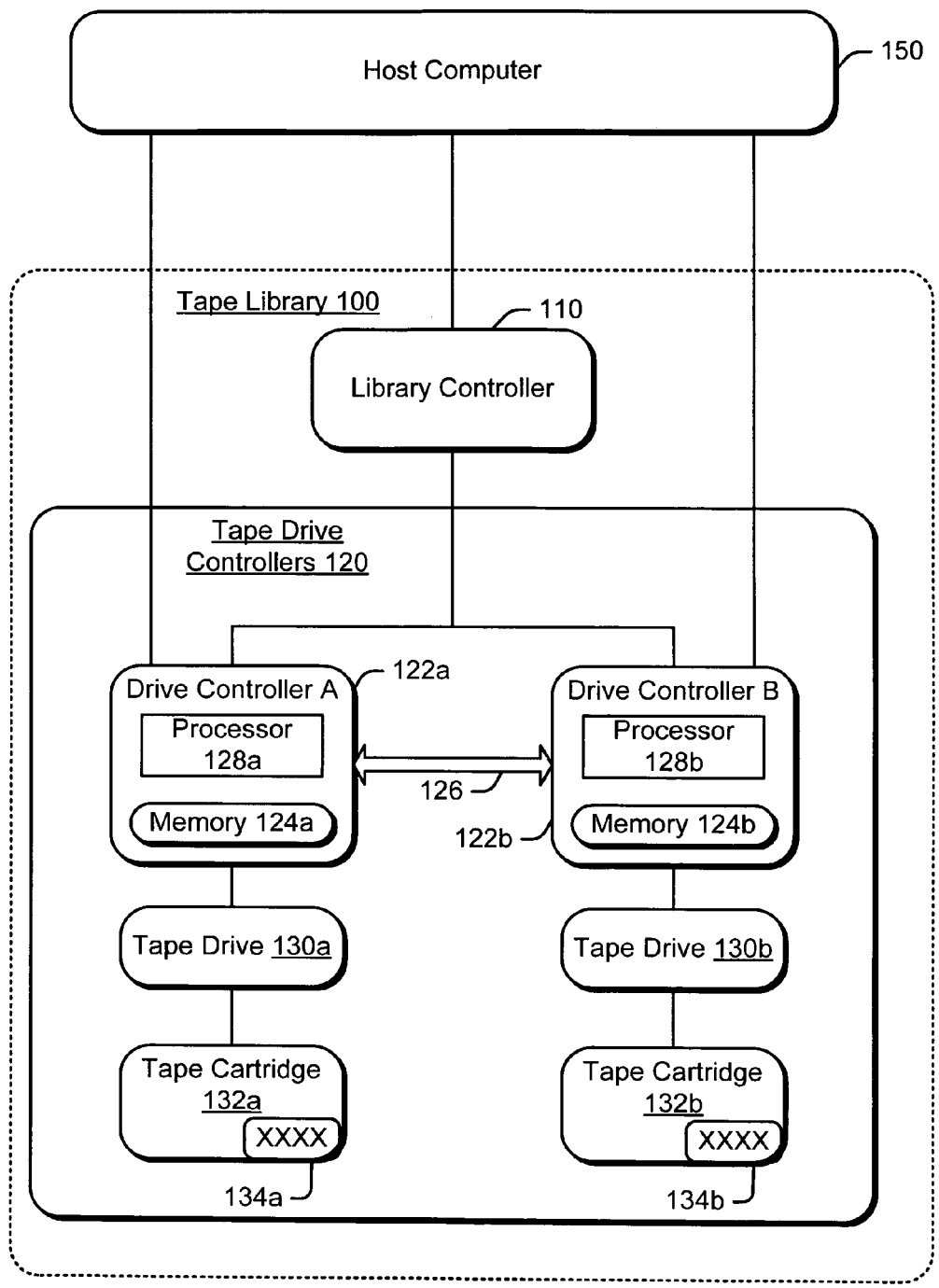
FIG. 1 is a schematic illustration of an exemplary embodiment of a tape library.

FIG. 1 is a schematic illustration of an exemplary embodiment of a tape library 100. The tape library 100 includes a library controller module 110, and one or more tape drive controllers 120, which are coupled to a plurality of tape drives 130a-130b via one or more interface buses, such as a small computer system interface (SCSI) bus. The library controller 110 is coupled to the tape drive controllers 120 via one or more interface buses. It is noted that the library controller 110 can be embodied as a separate component (as shown), or can be co-located with one or more of the driver controllers 120, or within a separate host computer 150. The library controller 110 may be implemented as a software module that runs on a general purpose processing unit of the tape library, or as a special-purpose chipset. In some embodiments the host computer 150 may be connected to the drive controllers and the library controller by another bus. By way of example, the host computer 150 may be connected to the library and drives using SCSI and the library may be connected to the drives using RS422.

The tape library controllers 120 coordinate data transfer to and from the one or more tape drives 130a-130b. In one embodiment, the library includes two tape drive controllers: a first tape drive controller 122a and a second tape drive controller 122b. The controllers may operate independently or may be configured to operate in parallel to enhance reliability by providing continuous backup and redundancy in the event that one controller becomes inoperable. Tape drive controllers 122a and 122b have respective processors 128a and 128b and respective memories 124a and 124b. Processors 128a, 128b may be implemented as general purpose processors that may be configured to execute logic instructions in the respective memories 124a, 124b, or as special purpose processors adapted to implement logic instructions embodied as firmware, or as ASICs. The memories 124a and 124b may be implemented as battery-backed, non-volatile RAMs (NVRAMs). Although only two controllers 122a and 122b are shown and discussed generally herein, aspects of this invention can be extended to other multi-controller configurations where more than two controllers are employed.

The controller's memories 122a and 122b may be physically coupled via a communication interface 126 such as, e.g., communication bus. Controllers 122a and 122b may monitor data transfers between them to ensure that data is accurately transferred and that transaction ordering is preserved (e.g., read/write ordering).

In one embodiment, the tape drives 130a, 130b are configured to receive a tape cartridge 132a, 132b, respectively. Input/Output (I/O) operations requested by host computer 150 may be executed against the respective tape cartridges 132a, 132b. The tape cartridges 132a, 132b may include respective unique external identifiers 134a, 134b, which may be implemented as a bar code or other external identifying indicia associated with the respective tape cartridge 132a, 132b.

Figure 2:
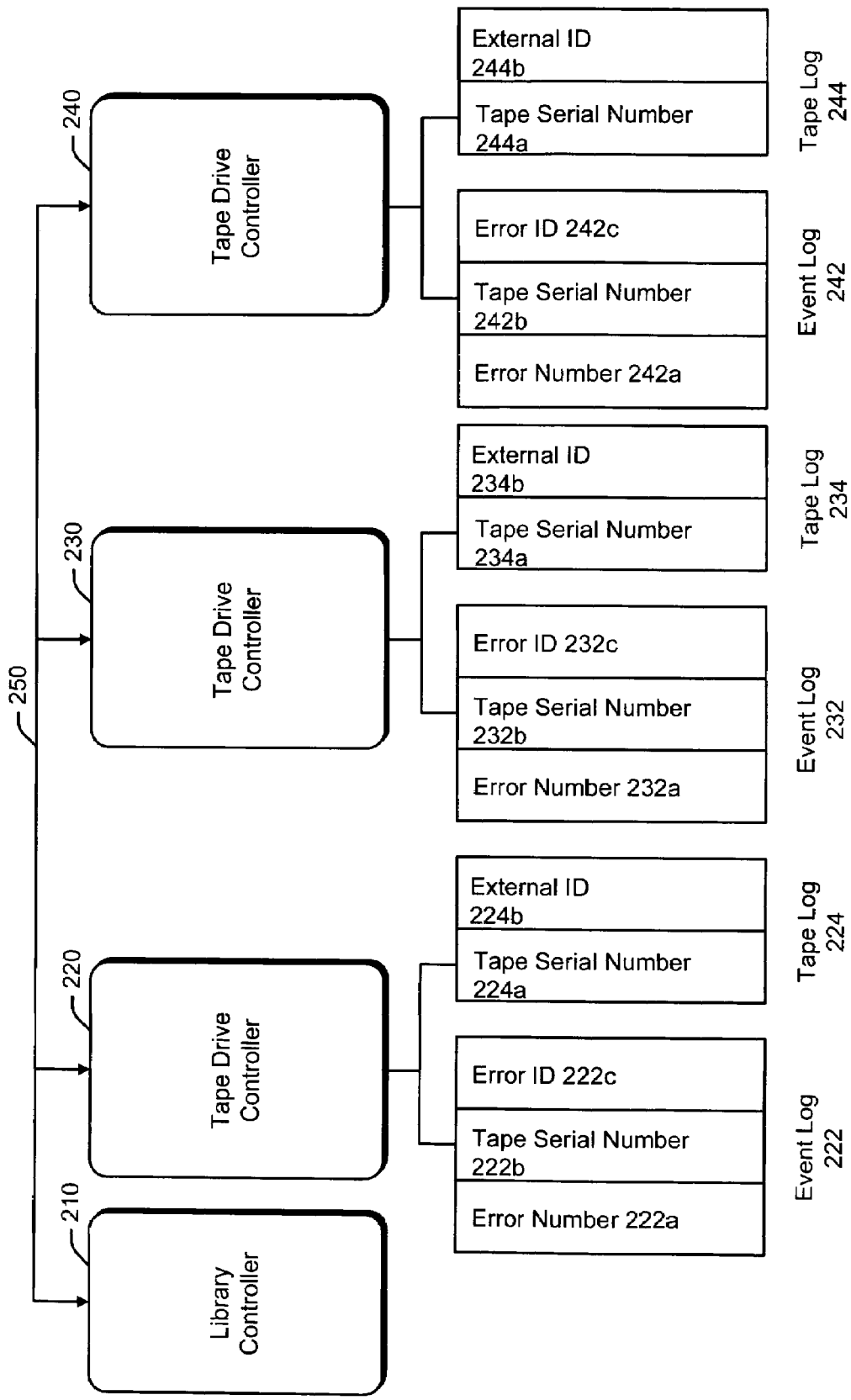
FIG. 2 is a schematic illustration of an exemplary embodiment of a tape library.

FIG. 2 is a schematic illustration of an exemplary embodiment of a tape library that illustrates event logs maintained by the tape libraries. Referring to FIG. 2, the tape library includes a library controller 210 and a plurality of tape controllers 220, 230, 240 communicatively connected to the library controller 210 by a suitable communication bus 250. The particular embodiment of the communication bus 250 is not critical. In one embodiment the communication bus may be implemented as a backplane and the respective tape controllers 220, 230, 240 may be implemented as cards that connect to the backplane. In alternate embodiments the communication bus may be implemented by a bus such as a PCI bus, or by a point-to-point connection such as an RS422 connection.

In one embodiment one or more of the tape controllers maintains one or more logs including a tape log and an event log. Errors that occur in the tape drive are recorded in the tape drive's event log. In the embodiment illustrated in FIG. 2 each tape controller 220, 230, 240 maintains a separate event log 222, 232, 242, respectively, in a memory location associated with the controller. In addition, each tape controller 220, 230, 240 maintains a separate tape log 224, 234, 244. In alternate embodiments the separate controllers may maintain a single event log and a single tape log in a memory location shared between the controllers. In another embodiment, the event log and tape log could be combined.

The respective event logs 222, 232, 242 may include information identifying, among other things, hardware and software packages operating on the controllers, the version number(s) of firmware executing on the controller, and other information associated with the controller. The event logs 222, 232, 242 may also log information regarding an error, including an error number 222a, 232a, 242a assigned to the error, a tape serial number 222b, 232b, 242b and an error identifier 222c, 232c, 242c associated with the error. The tape serial number is not necessarily associated with a human-readable identifier on the tape cartridge. In one embodiment, the respective tape logs 224, 234, 244 may include fields for storing information identifying, among other things, the respective tape serial numbers 224a, 234a, 244a and external identifiers 224b, 234b, 244b associated with each tape inserted into the drive. Optionally the respective tape logs 224, 234, 244 may also include an identifier associated with one or more drives in which the tape was previously inserted. In an alternate embodiment, the respective event logs 222, 232, 242 may include a field for recording the external identifier 134a, 134b of a tape cartridge 132a, 132b that resides in a tape drive 130a, 130b when an error occurs.

Exemplary Operations

Figure 3:
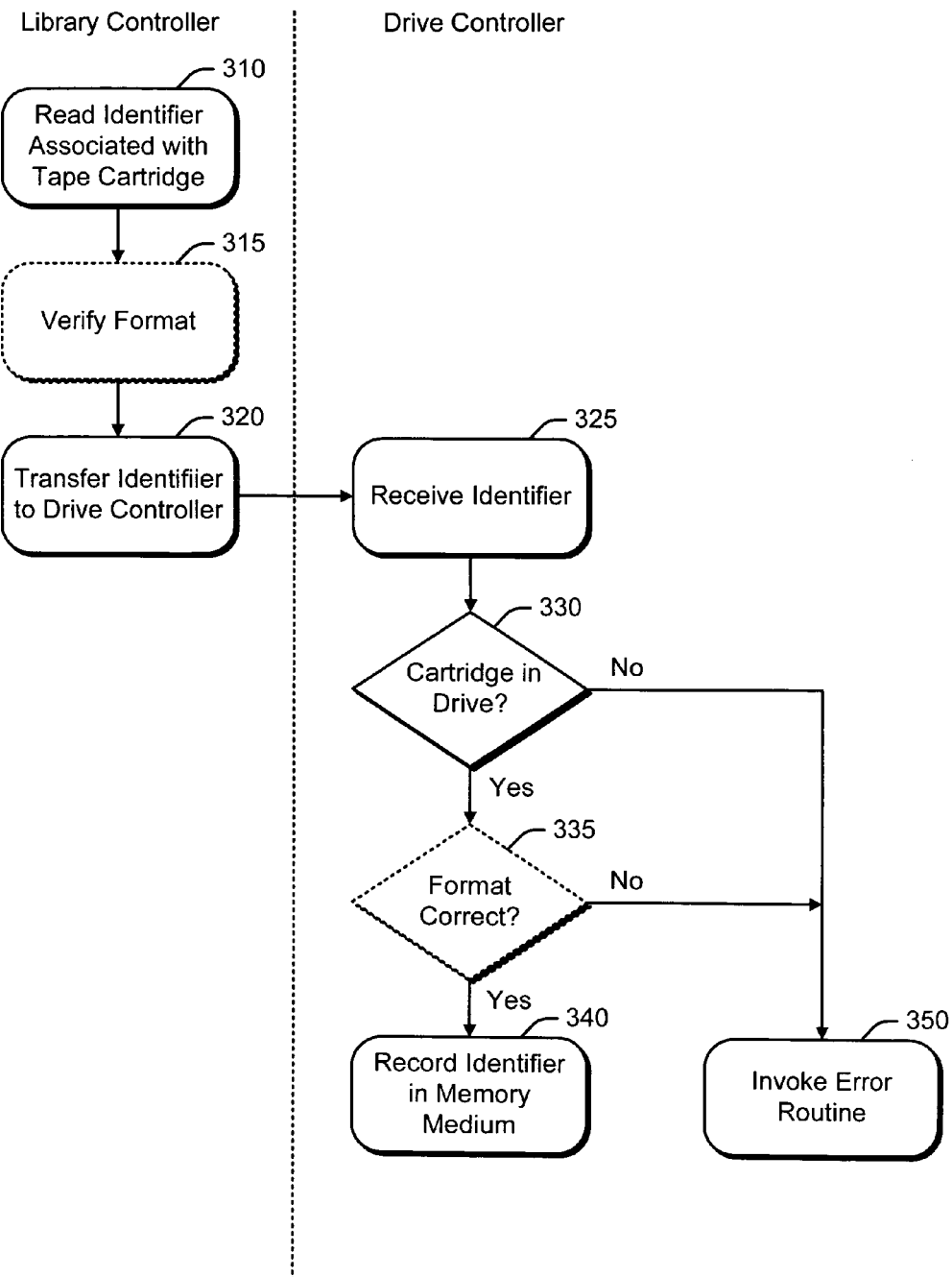
FIG. 3 is a flowchart illustrating operations in an exemplary embodiment of a method for recording an external identifier associated with a tape.

Operations for recording errors in tape drives will be explained with reference to FIGS. 3-4. FIG. 3 is a flowchart illustrating operations in one embodiment of a method for recording an external identifier associated with a tape. Referring to FIG. 3, at operation 310 a library controller such as library controller 210 reads an external identifier associated with a tape cartridge. In one embodiment the external identifier may be implemented as a bar code or other external identifying indicia associated with the tape cartridge. The library controller may read the barcode using a conventional optical scanner and associated software.

At operation 315 the library controller may verify the format of the external identifier. In one embodiment the format of the external identifier is encoded into a multi-character symbol, which may be verified by comparing the external identifier against one or more templates for external identifiers. If the format is incorrect, then an error routine may be invoked.

At operation 320 the library controller transfers indicia of the external identifier to a drive controller, such as one of the drive controllers 220, 230, 240. In one embodiment the multi-character symbol is transferred to the drive controller using SCSI commands executed by the library controller such as, e.g., the SCSI Write Attribute command, and the external identifier may be attached to the SCSI command in a payload section of a data packet.

At operation 325 the drive controller receives the external identifier transmitted by the library controller. At operation 330 the drive controller determines whether there is a tape cartridge in the drive, and if not an error routine may be invoked, at operation 350. In one embodiment the error routine may include transmitting a reply to the library controller, wherein the reply indicates that a tape cartridge is not properly installed in the drive. In response to the reply, the library controller may initiate a routine to locate the tape cartridge and insert the cartridge into the drive. Alternatively, or in addition, the error routine may involve generating an alert to notify a user or administrator of the system of a malfunction.

By contrast, if there is a tape cartridge in the drive at operation 330, then control passes to operation 335, in which the drive controller determines whether the format of the received external identifier is correct. In one embodiment the format of the external identifier is encoded into a multi-character symbol, which may be verified by comparing the external identifier against one or more templates for identifiers. If the format is incorrect, then an error routine may be invoked at operation 350. In one embodiment the error routine may include transmitting a reply to the library controller, wherein the reply indicates that a received external identifier is incorrectly formatted. In response to the reply, the library controller may initiate a read of the external identifier again and transfer the identifier to the drive controller. Alternatively, or in addition, the error routine may involve generating an alert to notify a user or administrator of the system of the error.

By contrast, if at operation 335 the received external identifier is formatted correctly, then the received identifier is recorded in a suitable memory medium (operation 340). In one embodiment, the received identifier may be recorded in a media auxiliary memory (MAM) associated with the tape cartridge. In alternate embodiments, the identifier may be recorded on a portion of the tape media.

Figure 4:
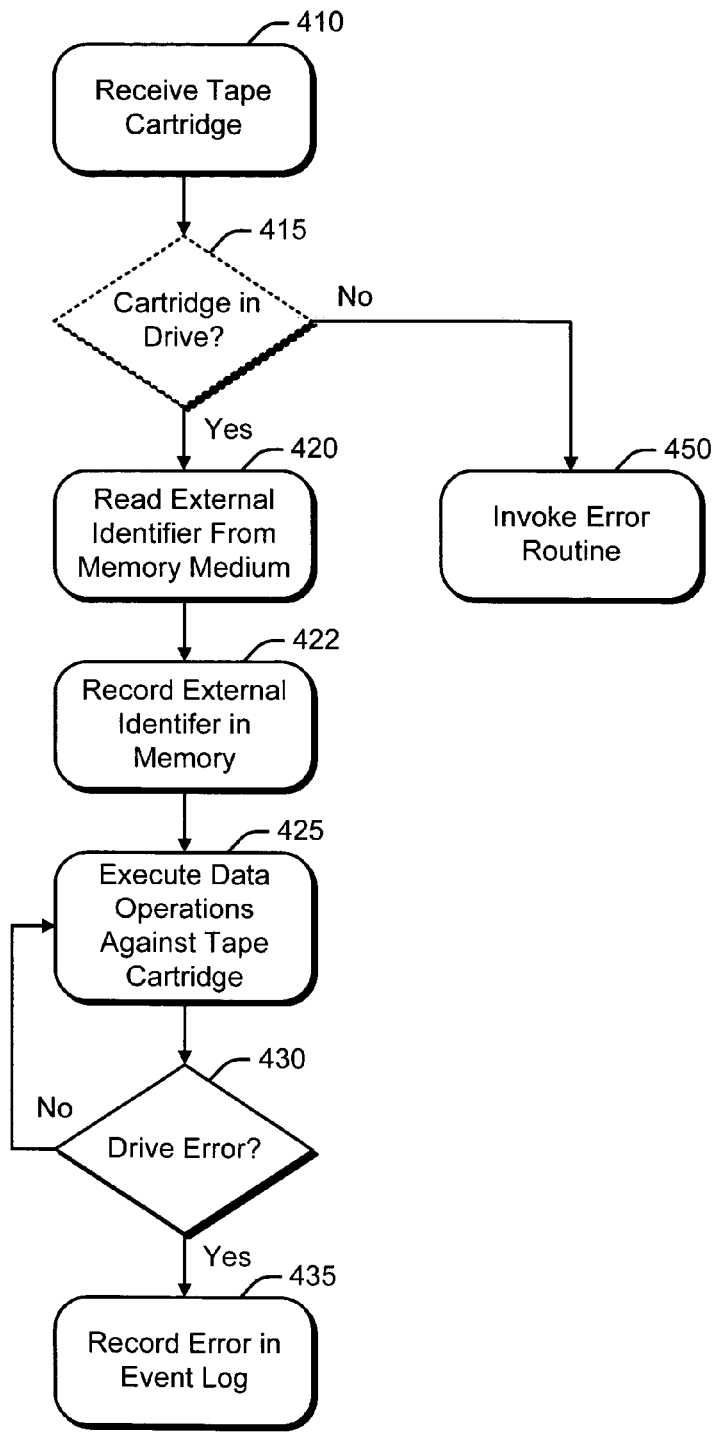
FIG. 4 is a flowchart illustrating operations in an exemplary embodiment of a method for recording an error in a drive controller.

FIG. 4 is a flowchart illustrating operations in an exemplary embodiment of a method for recording an error in a drive controller. At operation 410 the drive receives a tape cartridge. The tape cartridge may be loaded by mechanical means such as, e.g., a robotic arm, or manually. At operation 415 the drive controller determines whether the tape cartridge is loaded correctly in the drive. If not, then an error routine may be invoked at operation 450. As described above, the error routine may involve communicating with the library controller and/or generating notices or warnings for users of the system.

If, at operation 415, the cartridge is loaded correctly in the drive, then control passes to operation 420, and the drive controller reads the external identifier from the memory medium, i.e., either the MAM or the tape. At operation 422 the drive controller records the external identifier in a suitable memory location. In one embodiment, the external identifier is recorded in a tape log such as one of the tape logs 224, 234, 244. At operation 425 the drive controller executes one or more data operations against the storage medium in the tape cartridge. If, at operation 430, there are no errors, then control passes back to operation 425 and additional data operations may be executed against the tape drive.

By contrast, if at operation 430 a drive error occurs then control passes to operation 435 and then an error event is recorded in an event log, such as the event logs 222, 232, 242 depicted in FIG. 2. In one embodiment the external identifier is recorded with the error event in the event log.

Recording the external identifier in an event log enables a technician charged with analyzing the event log to locate the tape readily.

In an alternate embodiment, the tape serial number is recorded with the error event. In this embodiment, the tape serial number may be used as a search key to locate the external identifier associated with the tape cartridge in the tape log. This operation may be performed manually, e.g., by a technician, or automatically, e.g., by a software routine. Again, the external identifier enables a technician charged with analyzing the event log to locate the tape readily.

The operations of FIGS. 3-4 permit a tape storage system to develop event logs that record an external identifier associated with the tape, as depicted in FIG. 2. Not all operations depicted in FIGS. 3-4 are required. For example, the format verification operations 315 and 335 and the tape loading verification operation 415 may be omitted.

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

What is claimed is:

1. A method of operating a tape library, comprising:
   reading, by a library controller, an external identifier associated with a tape cartridge;
   loading the tape cartridge into a tape drive controlled by a drive controller;
   transmitting the external identifier to the drive controller;
   recording the external identifier in a memory medium associated with the tape cartridge;
   in a subsequent error analysis, associating an error in the tape drive with the external identifier of the tape cartridge in the tape drive;
   identifying a type of the error; and
   storing the type of the error and the external identifier of the tape cartridge to enable a user to identify the type of the error occurring in the tape cartridge.

2. The method of claim 1, wherein transmitting the external identifier to the drive controller comprises executing a small computer system interface (SCSI) command to transfer data from the library controller to the drive controller.

3. The method of claim 1, wherein recording the external identifier in a memory medium associated with the tape cartridge comprises recording the external identifier in a media auxiliary memory.

4. The method of claim 1, wherein recording the external identifier in a memory medium associated with the tape cartridge comprises recording the external identifier on a segment of the tape.

5. A tape library, comprising:
   a housing for receiving at least one tape cartridge;
      a library controller comprising a first processor and a memory communicatively connected to the first processor; and
      a tape drive controller comprising a second processor and a memory communicatively connected to the second processor,
   wherein the library controller executes logic instructions that cause the first processor to read an external identifier associated with a tape cartridge and to transmit the external identifier to the tape drive controller, and
   wherein the tape drive controller records the external identifier in a memory medium associated with the tape cartridge, and when an error occurs, the tape drive controller records (1) the external identifier in a log maintained by the tape drive controller and (2) a type of the error to enable a user to identify the type of the error occurring in the tape cartridge.

6. The tape library of claim 5, wherein:
   the external identifier comprises a bar code; and
   the library controller executes a command to read the bar code.

7. The tape library of claim 5, wherein the library controller verifies a format of the external identifier.

8. The tape library of claim 5, wherein the library controller executes a small computer system interface (SCSI) command to transfer data from the library controller to the drive controller.

9. The tape library of claim 5, wherein the drive controller records the external identifier in a media auxiliary memory associated with the tape cartridge.

10. The tape library of claim 5, wherein the drive controller records the external identifier on a segment of the tape.

11. The tape library of claim 5, wherein the drive controller creates an event log file and records the external identifier in the event log file.

12. A method of operating a tape library, comprising:
   executing a command to read, at a library controller, an external identifier associated with a tape cartridge;
   verifying a format of the external identifier;
   loading the tape cartridge into a tape drive controlled by a drive controller;
   transmitting the external identifier to a memory medium associated with the tape cartridge;
   in a subsequent error analysis, associating an error in the tape drive with the external identifier of the tape cartridge in the tape drive;
   identifying a type of the error; and
   storing the type of the error and the external identifier of the tape cartridge to enable a user to identify the type of the error occurring in the tape cartridge.

13. The method of claim 12, wherein transmitting the electronic indicia of the external identifier to a memory medium associated with the tape cartridge comprises recording the external identifier in a media auxiliary memory.

14. The method of claim 12, wherein transmitting the electronic indicia of the external identifier to a memory medium associated with the tape cartridge comprises recording the external identifier on a segment of the tape.

* * * * *